United States Patent [19]

Crosby

[11] Patent Number: 4,961,951
[45] Date of Patent: * Oct. 9, 1990

[54] POURABLE SHORTENING CONTAINING BUTTER AND METHOD FOR PREPARING

[75] Inventor: Thomas G. Crosby, Bourbonnais, Ill.

[73] Assignee: Bunge Foods Corporation, Bradley, Ill.

[*] Notice: The portion of the term of this patent subsequent to Oct. 2, 2007 has been disclaimed.

[21] Appl. No.: 320,697

[22] Filed: Mar. 8, 1989

Related U.S. Application Data

[63] Continuation-in-part of Ser. No. 216,111, Jul. 7, 1988.

[51] Int. Cl.$^5$ ................... A23C 15/12; A23D 7/00; A23D 9/00
[52] U.S. Cl. .................... 426/602; 426/603; 426/606; 426/607; 426/608; 426/613; 426/610
[58] Field of Search ............... 426/602, 606, 607, 608, 426/603

[56] References Cited

U.S. PATENT DOCUMENTS

| | | |
|---|---|---|
| 3,338,720 | 8/1967 | Pichel . |
| 3,397,998 | 8/1968 | Fricks . |
| 3,443,966 | 5/1969 | Reid . |
| 3,682,656 | 8/1972 | Wilton et al. . |
| 3,796,815 | 3/1974 | Lincklaen et al. . |
| 4,160,850 | 7/1979 | Hallstrom et al. . |
| 4,292,333 | 9/1981 | Bosco et al. . |
| 4,359,482 | 11/1982 | Crosby . |
| 4,375,483 | 3/1983 | Shuford et al. . |
| 4,384,008 | 5/1983 | Millisor . |
| 4,385,076 | 5/1983 | Crosby . |

FOREIGN PATENT DOCUMENTS

| | | |
|---|---|---|
| 7115372 | 4/1972 | Netherlands . |
| 1355967 | 6/1974 | United Kingdom . |

OTHER PUBLICATIONS

Rico-Munoz and Davidson, "Effect of Corn Oil and Casein on the Antimicrobial Activity of Phenolic Antioxidants," *Journal of Food Science*, vol. 48:4, Jul.–Aug. 1983.

Verrips, Smid and Kerkhof, "The Intrinsic Microbial Stability of Water-in-Oil Emulsions," *European Journal of Applied Microbiology and Biotechnology*, vol. 10, pp. 73–85, 1980.

Verrips and Zaalberg, "The Intrinsic Microbial Stability of Water-in-Oil Emulsions," *European Journal of Applied Microbiology and Biotechnology*, vol. 10, pp. 187–196, 1980.

Andres, Ed., "Flavor and Functional Attributes of Butter Available in Easy-to-Use Liquid Form," *Food Processing*, p. 76, Jun. 1983.

Primary Examiner—Marianne Cintins
Attorney, Agent, or Firm—Lockwood, Alex, Fitzgibbon & Cummings

[57] ABSTRACT

Shortening compositions containing one or more dairy components are provided in a form in which they are pourable even though they may contain substantial amounts of a butter component such as whole, real butter. The shortening compositions have a eutectic characteristic wherein the solids content of the shortening composition is lower than the combined respective solids contents of the individual ingredients thereof, including a shortening base component such as an edible oil, the butter component and, when desired, a flake component. These shortening compositions exhibit a taste profile that is exceptionally close to that of real, whole butter, particularly when compared with products that do not include any real dairy components.

19 Claims, 2 Drawing Sheets

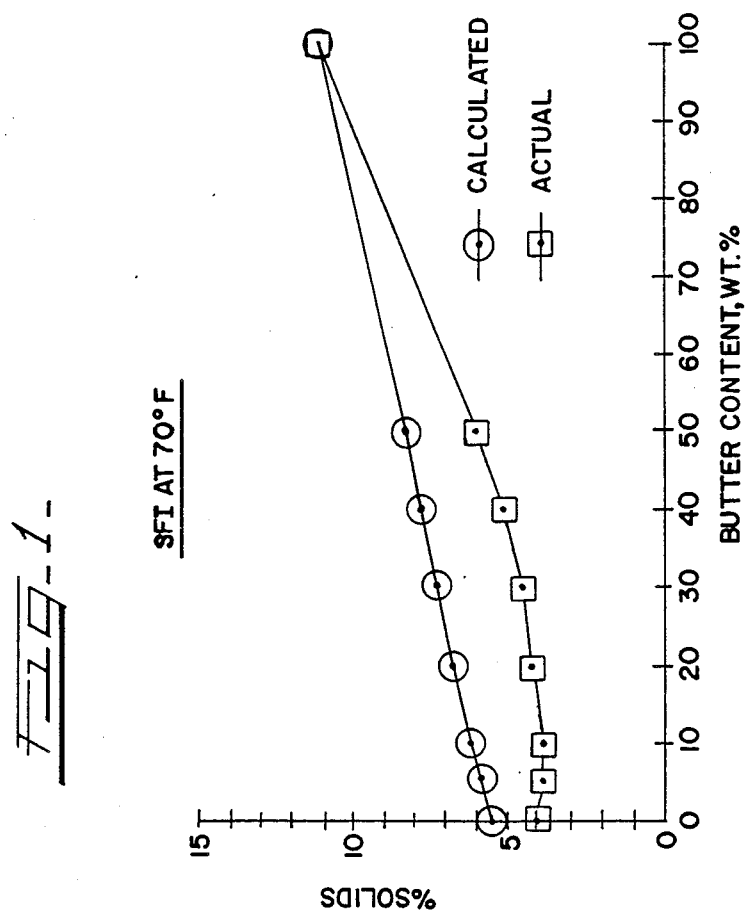

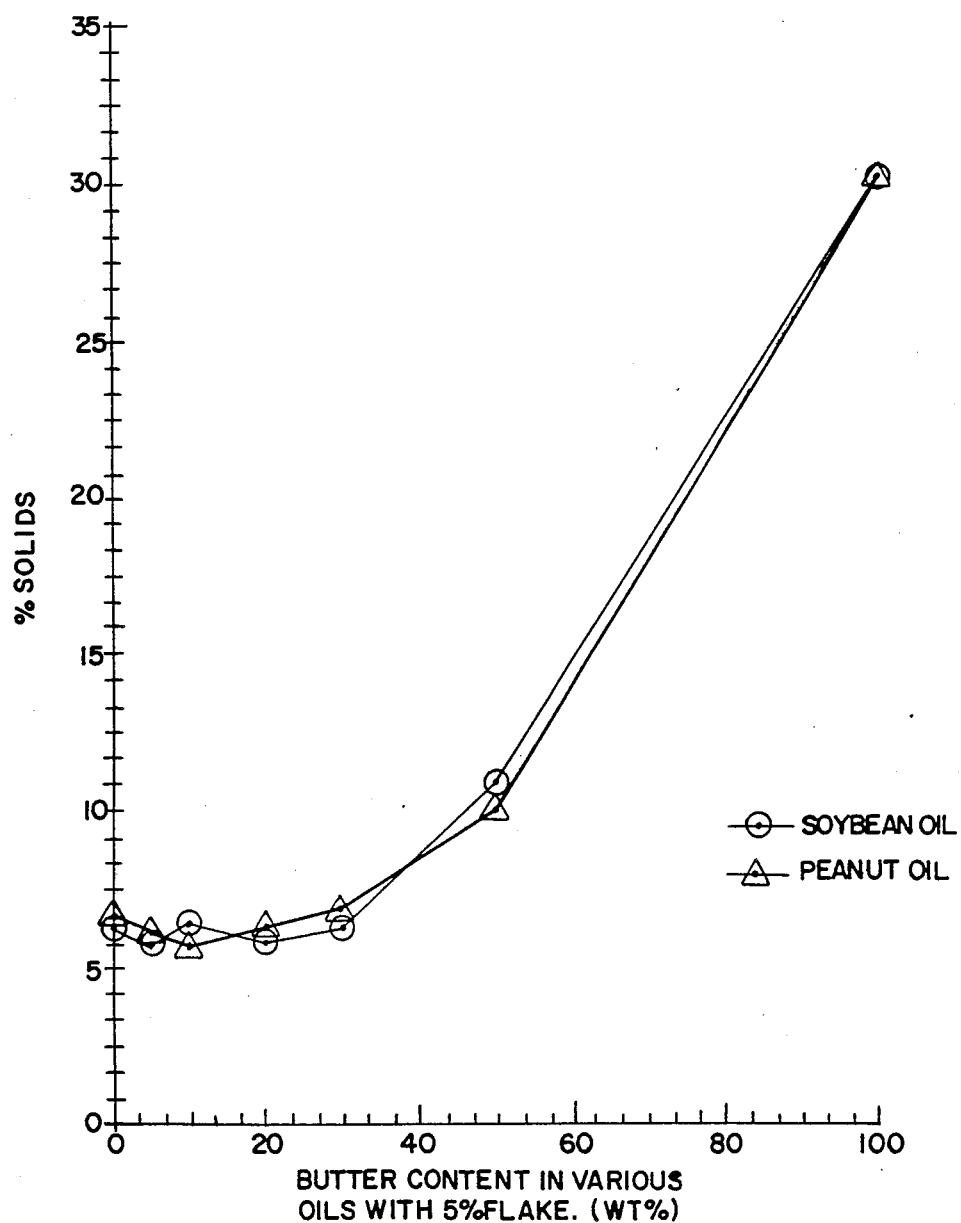

POURABLE SHORTENING CONTAINING BUTTER AND METHOD FOR PREPARING

This is a continuation-in-part of application Ser. No. 216,111, filed July 7, 1988, the subject matter of which is incorporated by reference hereinto.

BACKGROUND AND DESCRIPTION OF THE INVENTION

The present invention generally relates to shortening compositions that contain whole butter or the like and that are flowable or pourable at room temperatures or below. More particularly, the pourable shortening compositions according to this invention contain enough butter or the like so as to provide an exceptionally close match for the taste of butter, and the compositions are formulated so as to provide a system that is pourable without having to be heated to above room temperature, or even at refrigeration temperatures. Optionally, the compositions are also shelf-stable at room temperatures and do not require refrigeration. The pourable compositions, which contain a relatively low but significant level of butter, exhibit a eutectic solids profile at relatively low temperatures.

Shortening products that are easy to handle and convenient to store have been developed over the years in an effort to provide substitutes for butter or margarine that are more convenient to use and store and that are less expensive and have lower cholesterol levels than whole, real butter At times, such products are formulated so as to be pourable. Products of this type can also respond to the objective of being stable both from a microbiological standpoint and from the standpoint of being stable against phase separation, even when such formulations include water. Typically, these types of products are non-dairy compositions, which greatly simplifies problems associated with attempting to prepare shortening products that can be poured at room temperature or under refrigerated conditions. Products containing butter typically are not pourable due to the level and type of solids which occur in butterfat.

These types of non-dairy products, whether they are pourable or not, do not provide an entirely satisfactory butter flavor and taste. No real butter is included and, therefore, artificial and/or natural butter flavorings are used in order to attempt to approximate the taste and flavor of real whole butter. Blended products have been developed that incorporate real whole butter with margarine formulations in order to arrive at a product that more closely resembles real whole butter. These blended products typically are in solid form, such as stick or whipped products, and they are not pourable at room temperature or below, and these products are often ones that require refrigeration in order to achieve acceptable microbiological stability. Other blended products of this general type are non-pourable plastic compositions that are distributed in tins, tubs or other wide-mouthed containers.

Accordingly, there is a need for shortening products that include real dairy components in a manner such that the flavor of these products more closely approximates that of real whole butter and that do not rely exclusively upon natural and/or artificial butter flavorings in order to attempt to achieve this result. It is furthermore especially desirable that such products be of the type that exhibit acceptable pourability even when stored under refrigerated conditions. For convenience of use purposes, particularly in connection with cooking objectives, it is especially desirable to have such products exhibit a pourable consistency under at least room temperature conditions, as opposed to product consistencies that are of a plastic or spreadable nature.

By the present invention, not only are shortening compositions provided which contain real whole butter or the like, but also they exhibit pourability at room temperature or under refrigerated conditions. It is also possible, if desired, to formulate such shortening compositions which are shelf-stable and exhibit microbial stability under refrigerated or non-refrigerated conditions. An edible liquid base shortening component comprises a majority of the shortening compositions according to this invention, which further include up to as much as about 20 weight percent or more of real whole butter and/or butter substitutes containing significant quantities of dairy ingredients. The compositions exhibit a eutectic solid profile wherein the solids content of the composition is lower--at a given temperature, including unusually low temperatures--than the sum of the respective solids contents of the components of the composition.

It is accordingly a general object of the present invention to provide an improved pourable shortening composition that contains real whole butter.

Another object of this invention is to provide an improved shortening composition that is formulated with real butter or the like and that provides a close match for the taste of 100% whole, real butter.

Another object of the present invention is to provide an improved shelf-stable shortening composition that includes a dairy component while being pourable even when stored under room temperature or refrigerated conditions.

Another object of the present invention is to provide an improved shelf-stable shortening composition that is pourable at room temperature conditions and that can be formulated to be also shelf-stable under such conditions.

Another object of this invention is to provide an improved shelf-stable shortening composition that more closely approximates the flavor and taste of butter than do other shortening compositions that do not include any appreciable amounts of real whole butter or the like.

Another object of the present invention is to provide an improved butter-containing shortening composition that includes a eutectic combination of real whole butter or the like and liquid shortening components.

These and other objects, features and advantages of this invention will be clearly understood through a consideration of the following detailed description.

BRIEF DESCRIPTION OF THE DRAWINGS

In the course of this description, reference will be made to the attached drawings, wherein:

FIG. 1 is a plot of data illustrating the eutectic effect of the present invention; and FIG. 2 is a plot of data illustrating the present invention for different liquid base components.

DESCRIPTION OF THE PARTICULAR EMBODIMENTS

Shortening compositions according to this invention include an edible liquid shortening base component that comprises well in excess of half of the shortening composition on a weight percent basis, such being typically at least about 70 weight percent of the shortening composition. The shortening composition further includes in excess of about 1 weight percent of a butter component, and typically less than about 20 weight percent, of the shortening composition. The preferred butter component is whole butter. Butter substitutes containing substantial amounts of dairy components can be included in the butter component. Other components can be included such as water, salts, preservatives, emulsifiers, anti-foaming agents, coloring agents, additional protein sources, artificial flavors and the like. When a shelf-stable and microbially stable composition is desired, low levels of water are included, usually at not more than about 10 weight percent of the composition, together with an excess amount of salt and/or other preservative.

The edible liquid shortening component provides the edible oil base for the shortening composition. This liquid base shortening component can itself have a solids content, which should be sufficiently low so as to facilitate the maintenance of a fluid or pourable shortening composition product. Exemplary liquid base shortening components in this regard are those which include pourable vegetable oils such as soybean oil, corn oil, rapeseed or canola oil, sunflower oil, safflower oil, olive oil, cottonseed oil, winterized oils and the like. The liquid base shortening component can, if desired, also include a minor amount of a hard fat material or flake component such as soy flake or other non-pourable forms of soybean, rapeseed, corn and the like, typically only those which form beta crystals. A typical flake component is a vegetable oil which has been hydrogenated or hardened to an iodine value not greater than about 5. Such flake component, when present, should comprise a relatively low percentage of the liquid base shortening component, typically not more than about 12 weight percent of the liquid base shortening component, preferably less than 8 weight percent and most preferably about 6 weight percent or less of the liquid base shortening component.

These liquid base shortening components will comprise as low as 70 weight percent or less of the shelf-stable dairy material-containing shortening composition and could comprise as much as approximately 98 weight percent thereof. The preferred range is between about 75 and about 95 weight percent of the complete shortening composition, most preferably between about 78 and 88 weight percent.

An especially advantageous feature of the shelf-stable shortening composition according to the present invention is the inclusion of a significant quantity of a butter component that preferably is or includes whole butter or real dairy butter. The amount of the butter component included within the composition will typically be well in excess of 1 weight percent, and generally at least 2 weight percent, of the total shortening composition. As much as 20 weight percent of the butter component could be included, with the typically preferred range of the butter component being between about 5 and about 15 weight percent butter, most preferably between about 7 and about 12 weight percent. In the event that microbial stability is desired, the quantity of butter or the like may have to be adjusted downwardly if other sources of protein or nitrogen are included within the composition. In no instance, however, will it have to be lowered to such an extent that it will not be in excess of 1 weight percent.

If butter components other than whole butter are included, they may be referred to as butter substitutes or margarines which include a significant amount of dairy ingredients such as milk solids or other dairy sources of protein or nitrogen which provide nutrients for undesired microbial growth. A typical butter substitute would have a milk solids content in the general range of 1 to 5 percent.

As for the water content of the shortening compositions according to the present invention, they should include only very low levels of water when microbial stability is desired. In this instance, water is present in combination with a salt and/or some other preservative at a level at or in excess of the saturation level. This combination of water and salt or the like is of assistance in providing a product which has shelf stability under non-refrigerated or refrigerated conditions even though the product or composition includes water as well as nitrogen-containing or protein-containing dairy components. Water may be included at levels about 20 weight percent. When a low level of water is to be included, it typically will not be greater than, and preferably significantly less than, about 17 weight percent of the shortening composition, preferably in an amount of between about 2 and about 15 weight percent, and most preferably between about 4 and about 6 weight percent.

Exemplary salts that can be included within the shortening composition will typically be those that enhance the taste of the shortening composition while also assisting in maintaining its stability even when stored under non-refrigerated conditions. Inorganic salts, organic salts and treated salts may be used. Sodium chloride, calcium chloride, potassium chloride, sea salt, monosodium glutamate and treated salts may be used, either alone or in combination. An example of a treated salt is sodium chloride treated with calcium disodium ethylenediaminetetraacetic acid salt, which is additionally useful to chelate any active, pro-oxidant, heavy metal that may find its way into the shortening composition. Depending upon the particular salt, the shortening composition according to the invention may include greater than about 0.15 and not more than about 4 weight percent thereof or above. Other materials can also be included. Sugars, starches, and combinations thereof with salts could be used if consistent with the needs and objectives of the particular shortening composition.

For shelf-stable formulations, preservatives in addition to salts may also be included. Well-known preservatives in this regard include sodium benzoate, potassium sorbate and the like. In addition, these preservatives can function as mold inhibitors and can also, due to their transformation into acidic form such as sorbic acid or benzoic acid or the like, assist in maintaining a formulation having excess salt by virtue of the pH lowering effect of such edible acids. When these types of additional preservatives are added, they may be included at levels as high as about 1 weight percent, and they will typically be present at levels no lower than about 0.01 weight percent. The preservative and salt are present at levels so as to meet or exceed the solubility product thereof and be at or in excess of saturation at ambient temperature.

Closely associated components are those which may be characterized as antioxidants. Some known antioxidants that are useful in this regard include butylated hydroxyanisole (BHA), butylated hydroxytoluene (BHT), propyl gallate, and the tocopherols including alpha-tocopherol or vitamin E. Tertiary butyl hydroquinone (TBHQ) may be suitable if discoloration does not present a problem in the particular composition. These preservatives, salts or antioxidants can furthermore be used in combination with an edible organic acid such as citric acid or the like. The edible organic acids present in the shortening composition, whether added to the composition as an acid or formed from organic salt preservatives within the composition, are useful in adjusting the pH if desired in order to assist in blending components of the shortening composition and in order to aid in maintaining the shelf stability of the shortening composition. A typical shortening composition according to this invention will have a pH within the range of between about 5 and about 6.8, particularly when those compositions are to be shelf-stable.

Preferably, the shortening compositions will include an emulsifier. Emulsifiers such as lecithin, as well as monoglycerides and diglycerides, can be included at customary, as needed levels, typically between approximately 0.5 and about 2 weight percent. Lecithin is also known to impart antisticking properties to the shortening composition when it is used. It is also preferred to include antifoaming agents such as dimethylpolysiloxane (DMPS) which are useful in improving the handling properties of the shortening composition, particularly during the blending thereof. The antifoaming agent is added at amounts as needed and can be between about 0.0001 and about 0.001 weight percent. Coloring agents such as beta-carotene can also be included at customary levels in order to impart a yellow type of color to the shortening composition. For example, between about 0.001 and 0.01 weight percent of a thirty percent beta-carotene component may be included. Artificial and/or natural butter flavors could also be added when desired. These can further enhance the close match of the shortening compositions to the taste and flavor of real butter. These flavoring components are known in the art and may be included at typical amounts such as 0.005 to about 0.2 weight percent or until a desired degree of flavor enhancement is achieved.

When there is a desire to do so, a source of protein or nitrogen that is in addition to that provided by the butter component of the shortening composition can be included. Such nitrogen sources include dairy components such as non-fat dry milk solids, other milk materials, cream, whey and the like. When these are included, they should be kept at relatively low percentages, depending somewhat on the percentage of other dairy components present in the formulation, when it is desired to minimize the risk of creating microbiological stability problems.

The shortening compositions are made by standard procedures used for manufacturing edible oil products. Such procedures effect a blending of the various desired components together, which typically can include running them through a pumping apparatus and into a scraped wall heat exchanger. Ease of blending can be facilitated by making additions in a specific order which will be generally understood in the art.

A pourable shelf-stable shortening composition in accordance with this invention was subjected to taste testing in order to compare its taste with that of butter. A commercial non-dairy pourable shortening was similarly tested. The results indicated that the product according to the present invention had a taste not different from butter, while the taste of the non-dairy pourable product was significantly different from butter.

Compositions formulated according to the present invention were subjected to testing in order to illustrate the eutectic solids profile thereof. Details in this regard are provided in the following examples.

EXAMPLE 1

Pourable shortening compositions containing butter were prepared by blending a soybean oil based shortening with different percentages of butter and measuring the solids fat index (SFI) at 50° F., 70° F., 80° F., 92° F., and 104° F. The SFI values were determined according to the standard procedure of the American Oil Chemists Society (AOCS). The soybean oil-based shortening composition was composed primarily of partially hydrogenated soybean oil having an iodine value of about 102, blended with soy flake, citric acid, an antioxidant, and dimethylpolysiloxane. Data in this regard are reported in Table I. Table I also shows the SFI values at these five temperatures for 100 percent butter and for 100 percent of this soybean oil composition with no butter. The calculated SFI values were determined from these 100 percent SFI values by suitable pro-rata calculations from the percentage of butter and from the percentage of soybean oil composition without butter which were present in each blend. The actually measured SFI values were obtained by the blends made by stirring the indicated percentages of butter and soybean oil composition, each blend then being subjected to the SFI method of the AOCS.

The 70° F. calculated SFI data and the actually measured SFI data of Table I are plotted in FIG. 1. The calculated data show a plot that is closely linear, while the actually measured data illustrate the eutectic effect that is characteristic of the present invention. One might generally expect that there would be some mutual solubility of the butter and of the soybean oil component which would result in the actual solids percent being somewhat lower than the calculated solids percent, but such a lowering would be expected to be slight and to the same degree for relevant percentages of butter. However, as can be seen from the data of Table I, and as is illustrated in FIG. 1, the actually measured percent solids is significantly lower, at relevant temperatures and especially at the important butter percentages of 20 percent or lower. In this important range, the percent solids of the eutectic pourable blend is relatively constant, rather than increasing in a generally linear manner, as would be expected from the calculated data. Throughout the actual data curve illustrated in FIG. 1, the percent solids of the total composition including both the butter and the soybean oil is substantially less than what would be expected absent the eutectic characteristic of the present invention.

Except for the actual data generated at the higher SFI temperatures, the actually measured SFI values reported in Table I are significantly lower than the corresponding calculated values. In each instance when the SFI temperature was 50° F., 70° F. or 80° F., the actually measured SFI value for the blend is well over 10 percent lower than what one might expect from a calculation thereof, as the calculated data illustrate. At the important SFI temperatures of 50° F. and 70° F., actually measured SFI values were well in excess of 20 percent lower than the corresponding calculated values. This is not true at the unusually high SFI temperatures of 92° F. and 104° F. This is due to the fact that butter is completely molten or nearly so at these higher temperatures, which dramatically decreases the melting point of the blend, especially at the higher percentages of butter.

TABLE I

|  | 50° | 70° | 80° | 92° | 104° |
|---|---|---|---|---|---|
|  | SFI at Temp. °F. | | | | |
| 100% Butter | 31.0 | 11.1 | 7.7 | 1.6 | 0 |
| 100% Soybean oil Composition | 5.6 | 4.1 | 4.1 | 3.4 | 2.6 |
|  | Calculated SFI at °F. | | | | |
| Butter % | | | | | |
| 5% | 6.87 | 5.88 | 4.28 | 3.31 | 2.47 |
| 10% | 8.14 | 6.15 | 4.46 | 3.22 | 2.34 |
| 20% | 10.68 | 6.70 | 4.82 | 3.04 | 2.08 |
| 30% | 13.22 | 7.25 | 5.18 | 2.86 | 1.82 |
| 40% | 15.76 | 7.80 | 5.54 | 2.68 | 1.56 |
| 50% | 18.30 | 8.35 | 5.90 | 2.50 | 1.30 |
|  | Actually Measured SFI at °F. | | | | |
| Butter % | | | | | |
| 5% | 5.3 | 3.9 | 3.8 | 3.2 | 2.4 |
| 10% | 6.3 | 3.9 | 3.7 | 3.1 | 2.1 |
| 20% | 6.7 | 4.2 | 3.9 | 3.3 | 2.2 |
| 30% | 7.4 | 4.5 | 4.3 | 3.5 | 2.4 |
| 40% | 10.3 | 5.1 | 4.0 | 1.7 | 0.7 |
| 50% | 12.5 | 6.0 | 4.6 | 1.7 | 0 |

EXAMPLE 2

Blends were prepared in substantially the same manner as those of Example 1. In this case, soy flake was added to the oil composition at a 2 percent level, a 5 percent level or a 10 percent level. Each such oil and flake composition was blended with differing percentages of butter, and SFI values were determined at 50° F., 70° F., 80° F., 92° F. and 104° F. The oil used was a lightly hydrogenated soybean oil that was hardened to an iodine value of 102. This oil was blended with up to 50 percent whole butter. The actually measured SFI data are specified in Table II. The lower temperature SFI data illustrate the eutectic characteristic of the pourable butter-containing shortening compositions according to the invention.

TABLE II

| Oil % | Flake % | Butter % | Measured SFI at °F. | | | | |
|---|---|---|---|---|---|---|---|
|  |  |  | 50° | 70° | 80° | 92° | 104° |
| 100% | 2% | 0% | 5.0 | 3.4 | 3.2 | 2.6 | 1.9 |
| 95% | 2% | 5% | 6.3 | 3.8 | 3.7 | 2.5 | 2.1 |
| 90% | 2% | 10% | 6.7 | 4.0 | 3.6 | 2.8 | 1.9 |
| 80% | 2% | 20% | 8.4 | 4.5 | 3.7 | 2.6 | 1.8 |
| 70% | 2% | 30% | 9.2 | 4.5 | 3.6 | 2.1 | 1.3 |
| 50% | 2% | 50% | 11.9 | 5.4 | 3.9 | 1.4 | 0 |
| 100% | 5% | 0% | 9.2 | 8.0 | 7.9 | 7.3 | 6.3 |
| 95% | 5% | 5% | 9.3 | 7.8 | 7.7 | 7.1 | 6.0 |
| 90% | 5% | 10% | 9.8 | 7.5 | 7.5 | 6.9 | 5.6 |
| 80% | 5% | 20% | 10.5 | 7.5 | 7.2 | 6.2 | 4.9 |
| 70% | 5% | 30% | 10.4 | 5.9 | 5.3 | 3.9 | 2.9 |
| 50% | 5% | 50% | 15.1 | 8.1 | 6.9 | 4.4 | 2.9 |
| 100% | 10% | 0% | 15.6 | 14.8 | 15.0 | 14.6 | 13.3 |
| 95% | 10% | 5% | 14.6 | 13.8 | 13.9 | 13.7 | 12.3 |
| 90% | 10% | 10% | 15.7 | 14.3 | 14.2 | 13.6 | 12.0 |
| 80% | 10% | 20% | 14.5 | 12.2 | 12.0 | 11.3 | 9.9 |
| 70% | 10% | 30% | 13.1 | 9.7 | 9.4 | 8.3 | 7.0 |
| 50% | 10% | 50% | 16.9 | 10.7 | 9.8 | 7.8 | 6.2 |

EXAMPLE 3

Unhydrogenated peanut oil was combined with 5 percent, based upon the total weight of the peanut oil, of soybean flakes hardened to have an iodine value of 5 or less. This peanut oil and soybean flake composition was blended with up to 50 weight percent of whole butter, and SFI values were measured at 50° F., 70° F., 80° F., 92° F. and 104° F. The data generated in this regard are reported in Table 3, and the 50 degree data are plotted in FIG. 2. The eutectic characteristic of the present invention is clearly seen from FIG. 2, as well as from other data in Table III. Again, the high SFI temperature data reported in Table III reflect the inherent property of butter to melt fully at elevated temperatures, which effect is especially evident in those formulations having a high butter content.

Table III also reports data generated in a similar manner, except unhydrogenated soybean oil was substituted for peanut oil. The 50° F. SFI data in this regard are also plotted in FIG. 2, from which it can be seen that similar results were achieved. In addition, Table III includes SFI data for 100 percent butter, which can be used to calculate expected SFI values for these butter-containing compositions.

TABLE III

|  | Flake % | Butter % | Measured SFI at °F. | | | | |
|---|---|---|---|---|---|---|---|
|  |  |  | 50° | 70° | 80° | 92° | 104° |
| Peanut Oil % | | | | | | | |
| 110% | 5% | 0% | 6.6 | 6.4 | 6.6 | 6.3 | 5.9 |
| 95% | 5% | 5% | 6.1 | 5.9 | 6.2 | 5.9 | 5.4 |
| 90% | 5% | 10% | 5.7 | 5.5 | 5.7 | 5.4 | 4.8 |
| 80% | 5% | 20% | 6.3 | 5.4 | 5.6 | 5.2 | 4.3 |
| 70% | 5% | 30% | 6.8 | 5.5 | 5.4 | 4.8 | 4.0 |
| 50% | 5% | 50% | 10.0 | 6.7 | 5.9 | 3.9 | 2.9 |
| Soybean Oil % | | | | | | | |
| 100% | 5% | 0% | 6.3 | 6.3 | 6.5 | 6.2 | 5.6 |
| 95% | 5% | 5% | 5.8 | 5.7 | 5.8 | 5.5 | 4.8 |
| 90% | 5% | 10% | 6.4 | 5.7 | 5.9 | 5.5 | 4.7 |
| 80% | 5% | 20% | 5.8 | 4.2 | 4.1 | 3.6 | 2.8 |
| 70% | 5% | 30% | 6.3 | 4.5 | 4.3 | 3.7 | 0 |
| 50% | 5% | 50% | 10.8 | 6.1 | 5.3 | 3.7 | 0 |
| 0% | 0% | 100% | 30.3 | 11.0 | 7.9 | 2.0 | 0 |

EXAMPLE 4

Lightly hydrogenated soybean oil which was hardened to an iodine value of 102 was combined with soy flake having an iodine value of not greater than 5 at levels of 2 percent, 5 percent and 10 percent. These respective combinations of oil and flake were blended with whole butter as specified in Table IV. SFI values were determined for each blend of butter, soybean oil and flake thus prepared. SFI values were taken at 50° F., 70° F., 80° F., 92° F. and 104° F. These data, as well as SFI data for 100 percent real butter are reported in Table IV. These data illustrate the eutectic characteristics of the present invention much in the same manner as they are illustrated in Example 2.

TABLE IV

| Soybean Oil % | Flake % | Butter % | SFI at °F. | | | | |
|---|---|---|---|---|---|---|---|
|  |  |  | 50° | 70° | 80° | 92° | 104° |
| 95% | 2.0% | 5% | 5.0 | 3.3 | 3.1 | 2.4 | 1.7 |
| 90% | 2.0% | 10% | 7.2 | 4.0 | 3.7 | 3.0 | 2.0 |
| 80% | 2.0% | 20% | 8.0 | 4.2 | 3.6 | 2.3 | 1.4 |
| 70% | 2.0% | 30% | 9.5 | 4.8 | 3.8 | 2.0 | 0.8 |
| 50% | 2.0% | 50% | 13.3 | 6.3 | 4.6 | 2.0 | 0.0 |
| 100% | 2.0% | 0% | 5.4 | 3.5 | 3.5 | 2.5 | 2.0 |
| 95% | 5.0% | 5% | 8.6 | 6.9 | 7.0 | 6.6 | 5.2 |
| 90% | 5.0% | 10% | 8.6 | 6.6 | 6.5 | 6.1 | 4.9 |
| 80% | 5.0% | 20% | 9.3 | 6.8 | 6.5 | 5.4 | 4.4 |
| 70% | 5.0% | 30% | 10.5 | 6.9 | 6.2 | 4.9 | 3.8 |
| 50% | 5.0% | 50% | 14.5 | 8.0 | 6.7 | 4.3 | 2.1 |
| 100% | 5.0% | 0% | 8.6 | 7.1 | 7.2 | 7.0 | 5.8 |
| 95% | 10.0% | 5% | 13.3 | 12.9 | 13.0 | 13.0 | 11.7 |

TABLE IV-continued

| Soybean Oil % | Flake % | Butter % | SFI at °F. | | | | |
|---|---|---|---|---|---|---|---|
| | | | 50° | 70° | 80° | 92° | 104° |
| 90% | 10.0% | 10% | 13.3 | 12.2 | 12.4 | 12.0 | 10.8 |
| 80% | 10.0% | 20% | 13.7 | 12.1 | 12.0 | 11.0 | 10.0 |
| 70% | 10.0% | 30% | 14.0 | 11.3 | 11.1 | 9.8 | 8.6 |
| 50% | 10.0% | 50% | 16.3 | 10.3 | 9.7 | 7.3 | 5.7 |
| 100% | 10.0% | 0% | 13.6 | 13.1 | 13.3 | 13.3 | 12.1 |
| 0% | 0% | 100% | 31.7 | 11. | 8.4 | 2.3 | 0.0 |

It will be understood that the embodiments of the present invention which have been described are illustrative of some of the applications of the principles of the present invention. Numerous modifications may be made by those skilled in the art without departing from the true spirit and scope of the invention.

I claim:

1. A ready-to-use pourable shortening composition that contains a butter component, the shortening composition comprising:
   at least about 70 weight percent, based upon the total weight of the composition, of an edible liquid shortening base component, said edible liquid shortening base component having solids fats index values which are a function of temperature;
   in excess of about 1 weight percent, based upon the total weight of the shortening composition, of a butter component, said butter component having solids fat index values which are a function of temperature, wherein the butter component is selected from the group consisting of whole butter, butter substitutes including dairy ingredients, and mixtures thereof; and
   the shortening composition having the combination of said edible shortening base component and said butter component has a eutectic characteristic wherein said shortening composition is pourable at ambient, non-refrigeration temperatures as well as at refrigerated temperatures, and wherein said shortening composition has a solids fat index value that is substantially lower than a sum of said respective solids fat index values of said edible shortening base component and of said butter component at a temperature at or below ambient temperature.

2. The shortening composition according to claim 1, wherein said edible shortening base component is a pourable vegetable oil component and an edible flake component comprising not more than about 12 weight percent of the edible liquid shortening base component.

3. The shortening composition according to claim 1, wherein said butter component is whole, real butter present in the shortening composition in an amount up to about 20 weight percent, based upon the total weight of the shortening composition.

4. The shortening composition according to claim 1, wherein said edible liquid shortening base component is present at between about 75 and about 95 weight percent, and said butter component is present at between about 5 and about 25 weight percent, both based upon the total weight of the shortening composition.

5. The shortening composition according to claim 1, wherein said edible liquid shortening base component is present at between about 78 and about 88 weight percent, based upon the total weight of the composition.

6. The shortening composition according to claim 1, wherein said butter component is present at between about 7 and about 12 weight percent, based upon the total weight of the shortening composition.

7. The shortening composition according to claim 1, wherein the shortening composition has a pH of between about 5 and about 6.8.

8. The shortening composition according to claim 1, wherein the shortening composition is formulated so as to be microbially stable at 25° C. and above.

9. The shortening composition according to claim 1, wherein the shortening composition further includes: a water component in an amount that does not exceed approximately 10 weight percent, based upon the total weight of the shortening composition, and a salt component present at a level which is in excess of its saturation level in the water component at ambient temperature, wherein said shortening composition is microbiologically stable at ambient, non-refrigerated temperatures as well as at refrigerated temperatures.

10. The shortening composition according to claim 9, wherein said water component is present at between about 4 and about 6 weight percent, based upon the total weight of the shortening composition.

11. The shortening composition according to claim 1, wherein the solids fat index value of the pourable composition is significantly lower than said sum of the respective solids fat index value of the edible liquid shortening base component and of the butter component at ambient, non-refrigerated temperatures as well as at refrigerated temperatures.

12. The shortening composition according to claim 11, wherein the significantly lower solids fat index value is exhibited when the shortening composition is at a temperature of between about 40° F. and about 80° F.

13. The shortening composition according to claim 1, wherein the solids content of the shortening composition is at least 10 percent lower than said sum of the respective solids fat index values of the shortening base component and of the butter component.

14. The shortening composition according to claim 1, wherein the solids fat index value of the shortening composition is at least 20 percent lower than said sum of the respective solids fat index values of the shortening base component and of the butter component.

15. The shortening composition according to claim 1, wherein said composition exhibits a eutectic solids profile at temperatures between about 40° F. and about 80° F.

16. A method for formulating a ready-to-use shortening composition that is pourable at ambient, non-refrigerated temperatures as well as at refrigerated temperatures, the method comprising:
   blending at least about 70 weight percent, based upon the total weight of the composition, of an edible liquid shortening base component together with in excess of 1 weight percent, based upon the total weight of the shortening composition, of a butter component, wherein the butter component is selected from the group consisting of whole butter, butter substitutes including dairy ingredients, and mixtures thereof; and
   simultaneously lowering the solids content of the pourable shortening composition to a value that is lower than the combined respective solids contents of the edible liquid shortening base component and of the butter component at a temperature which is at or below ambient temperature.

17. The method according to claim 16, wherein said blending step further includes adding up to about 12 weight percent of a flake component, and wherein said lowering step reduces the solids fat index value of the shortening composition to less than the respective combined solids fat index values of the edible liquid shortening base component, of the butter component and of the flake component.

18. The method according to claim 16, wherein said temperature is between about 40° F. and about 80° F.

19. The method according to claim 16, wherein said temperature is between about 50° F. and about 70° F.

* * * * *

UNITED STATES PATENT AND TRADEMARK OFFICE
CERTIFICATE OF CORRECTION

PATENT NO. : 4,961,951
DATED : October 9, 1990
INVENTOR(S) : Thomas G. Crosby

It is certified that error appears in the above-identified patent and that said Letters Patent is hereby corrected as shown below:

Col. 7, line 17,

"40% 15.76        7.80    5.54    2.68    1.56"

should read:

--40%          15.76    7.80    5.54    2.68    1.56--.

Col. 8, line 25, "110%" should read --100%--.

Col. 10, line 35, delete "content" and insert --fat index value-- after "solids".

Signed and Sealed this

Fifth Day of April, 1994

Attest:

BRUCE LEHMAN

Attesting Officer    Commissioner of Patents and Trademarks